Patented Nov. 21, 1950

2,531,012

UNITED STATES PATENT OFFICE 2,531,012

9-[2-(2 - HYDROXYETHYLAMINO)-ETHYL-AMINO] - 2 - METHOXYACRIDINE AND METHOD FOR ITS PRODUCTION

Alexander R. Surrey, Albany, N. Y., assignor to Sterling Drug Inc., Wilmington, Del., a corporation of Delaware No Drawing. Application January 22, 1949, Serial No. 72,268

3 Claims. (Cl. 260—279)

The present invention relates to new chemotherapeutically useful acridine compounds derived from a 9-aminoacridine, and the preparation thereof. More particularly, said acridine compounds are 9-(2-(2-hydroxyethylamino)ethylamino)-2-methoxyacridine and acid addition salts thereof.

The compounds of this invention have been found to possess useful chemotherapeutic properties, especially as anthelmintic agents.

The basic acridine compound, 9-(2-(2-hydroxyethylamino)ethylamino)-2-methoxyacridine having the formula

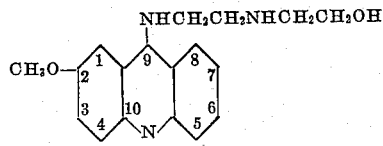

can be prepared by various methods. However, the procedure preferred in practicing the invention involves heating a mixture of phenol and 9-chloro-2-methoxyacridine to form 9-phenoxy-2-methoxyacridine hydrochloride (which need not be isolated), which is then heated with 2-(2-hydroxyethylamino)ethylamine. While the foregoing procedure is preferred in practicing my invention, other methods of preparing said basic acridine compound are operable. For example, 9-chloro-2-methoxyacridine can be heated directly with 2-(2-hydroxyethylamino)ethylamine without first reacting the former with phenol. In addition, the basic side chain can be attached stepwise to the acridine nucleus. In such a process, 9-chloro-2-methoxyacridine or 9-phenoxy-2-methoxyacridine hydrochloride is heated with 2-hydroxyethylamine to give 9-(2-hydroxyethylamino)-2-methoxyacridine, which is then treated with a halogenating agent such as thionyl chloride to yield 9-(2-chloro-ethylamino)-2-methoxyacridine, which, in turn, is treated with 2-hydroxyethylamine to give the desired basic acridine compound, 9-(2-(2-hydroxyethylamino)ethylamino)-2-methoxyacridine.

The salts of the instant invention are prepared by treating the foregoing described basic acridine compound with the appropriate acid. In practicing my invention I found it convenient to employ the dihydrochloride salt. However, other salts are within the scope of the invention. Included among other salts which may be employed are the following, formed by reacting the base with the appropriate relatively non-toxic inorganic or organic acid: the dihydrobromide, diphosphate, disulfate, disulfamate, diethanesulfonate, ditartrate, dicitrate, disuccinate, diacetate, dibenzoate, dioleate, and the like.

The following example will further illustrate a specific embodiment of my invention.

9-(2-(2-hydroxyethylamino)ethylamino)-2-methoxyacridine dihydrochloride.—A stirred mixture of 50 g. of phenol and 11.5 g. of 9-chloro-2-methoxyacridine was heated on the steam bath for about 15 minutes and 6 g. of 2-(2-hydroxyethylamino)ethylamine was added. After heating for about 2 hours on the steam bath the slightly cooled reaction mixture was poured into a stirred solution of 12 cc. of conc. hydrochloric acid in 150 cc. of acetone. After about 1 hour the product was filtered off, washed with acetone and then freed from most of the adhering phenol by stirring in hot acetone and filtering the mixture while hot. The resulting solid was recrystallized twice from water-ethanol, yielding about 9.5 g. of the desired product, 9-(2-(2-hydroxyethylamino)ethylamino)-2-methoxyacridine dihydrochloride, M. P. 212–214.5° C. (corr.).

I claim:

1. A compound selected from the group consisting of 9-(2-(2-hydroxyethylamino)ethylamino)-2-methoxyacridine having the formula

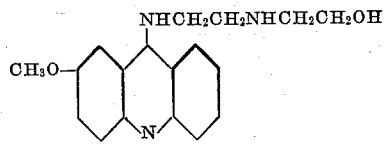

and acid addition salts thereof.

2. 9-(2-(2-hydroxyethylamino)ethylamino)-2-methoxyacridine dihydrochloride having the formula

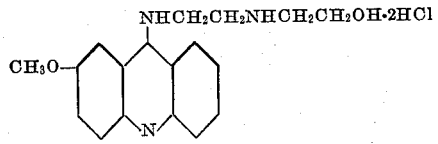

3. In the process of preparing 9-(2-(2-hydroxyethylamino)ethylamino)-2-methoxyacridine having the formula

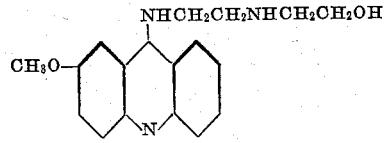

the step which comprises heating a member of the group consisting of 9-chloro-2-methoxyacridine and 9-phenoxy-2-methoxyacridine hydrochloride with 2-(2-hydroxyethylamino)ethylamine.

ALEXANDER R. SURREY.

(References on following page)

REFERENCES CITED

The following references are of record in the file of this patent:

UNITED STATES PATENTS

| Number | Name | Date |
|---|---|---|
| 2,113,357 | Mietzsch et al. | Apr. 5, 1938 |

OTHER REFERENCES

Shrimer et al., "Synthetic Antimalarials," (published in Bloomington, Indiana, 1941), page 30.

Mosher, "Antimalarials, Natural and Synthetic" (Edwards Bros., Ann Arbor, Mich. 1942), page 69.

Chem. Abst., vol. 37, page 2408 (1943), (Giting: Proc. Soc. Exp't'l. Biol. Med., vol. 52, pages 90–91 (1943).

Certificate of Correction

Patent No. 2,531,012 — November 21, 1950

ALEXANDER R. SURREY

It is hereby certified that error appears in the printed specification of the above numbered patent requiring correction as follows:

Column 1, lines 16 to 19, inclusive, for that portion of the formula reading

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*